(12) United States Patent
Zou et al.

(10) Patent No.: US 7,515,906 B2
(45) Date of Patent: Apr. 7, 2009

(54) METHOD OF IMPLEMENTING AUTHENTICATION OF HIGH-RATE PACKET DATA SERVICES

(75) Inventors: Fengshao Zou, Shenzhen (CN); Wenxian Li, Shenzhen (CN); Zhuo Li, Shenzhen (CN); Jianghai Gao, Shenzhen (CN); Shikui Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 583 days.

(21) Appl. No.: 11/273,886

(22) Filed: Nov. 15, 2005

(65) Prior Publication Data

US 2006/0121895 A1 Jun. 8, 2006

Related U.S. Application Data

(63) Continuation of application No. PCT/CN2004/000496, filed on May 17, 2004.

(30) Foreign Application Priority Data

May 16, 2003 (CN) ................... 03 1 31034

(51) Int. Cl.
*H04Q 7/20* (2006.01)
*H04M 3/16* (2006.01)
(52) U.S. Cl. ............... 455/433; 455/411; 455/435.1
(58) Field of Classification Search .................. None
See application file for complete search history.

(56) References Cited

U.S. PATENT DOCUMENTS 5,539,824 A * 7/1996 Bjorklund et al. ........... 380/249
5,596,641 A * 1/1997 Ohashi et al. ............... 380/248
5,729,537 A * 3/1998 Billstrom .................... 370/329

(Continued)

FOREIGN PATENT DOCUMENTS

| CN | 1227688 | 9/1999 |
|---|---|---|
| CN | 1259811 | 7/2000 |
| JP | 2001005784 | 1/2001 |
| JP | 2001357018 | 12/2001 |
| WO | WO 97/48208 | 12/1997 |

OTHER PUBLICATIONS

International Search Report for PCT/CN2004/00496, dated Aug. 2, 2004.
Huawei, "WLAN User Authentication for Mobile Operators," pp. 1-7 (2008).

*Primary Examiner*—Ajit Patel
(74) *Attorney, Agent, or Firm*—Leydig, Voit & Mayer, Ltd.

(57) ABSTRACT

Disclosed is a method for implementing authentication of high rate packet data (HRPD) services, applicable to multi-mode networks including IS95/CDMA2000 1x and CDMA2000 HRPD networks. The method includes an Access Terminal (AT) using the user information in the User Identity Module (UIM) as the user identifier and starting an authentication in accordance with the Extended Authentication Protocol (EAP). A Mobile Switching Center (MSC)/Visiting Location Register (VLR) obtains a random number and a first authentication number based on the user identifier, and the AT calculates a second authentication number based on said random number. The MSC/VLR compares the first authentication number with the second authentication number to determine whether they are consistent. If consistent, the authentication is successful. Otherwise, the authentication is aborted. With the disclosed method, authentication can be made by using the original MSC and HLR/AC in the CDMA IS95 or CDMA2000 1x network. The method allows low cost and easy operation for the user as well as convenient maintenance for the operator.

20 Claims, 4 Drawing Sheets

U.S. PATENT DOCUMENTS

| | | |
|---|---|---|
| 5,784,464 A | 7/1998 | Akiyama et al. ............... 380/25 |
| 6,584,310 B1 | 6/2003 | Berenzweig ................. 455/432 |
| 6,876,747 B1 * | 4/2005 | Faccin et al. ................ 380/247 |
| 7,155,526 B2 * | 12/2006 | Chaudhary et al. .......... 709/229 |
| 7,356,145 B2 * | 4/2008 | Ala-Laurila et al. ......... 380/247 |
| 2003/0096595 A1 * | 5/2003 | Green et al. ................ 455/411 |
| 2003/0236980 A1 * | 12/2003 | Hsu ............................ 713/168 |
| 2004/0088550 A1 * | 5/2004 | Maste ........................ 713/182 |
| 2004/0236964 A1 * | 11/2004 | Haverinen ................... 713/201 |
| 2005/0286489 A1 * | 12/2005 | Shin et al. ................... 370/352 |
| 2007/0281687 A1 * | 12/2007 | Jiang ........................... 455/433 |

* cited by examiner

METHOD OF IMPLEMENTING AUTHENTICATION OF HIGH-RATE PACKET DATA SERVICES

CROSS-REFERENCES TO RELATED APPLICATIONS

This is a continuation of International Application No. PCT/CN2004/000496, which was filed on May 17, 2004, and which, in turn, claimed the benefit of Chinese Patent Application No. 03131034.6, which was filed on May 16, 2003, the entire disclosures of which are hereby incorporated herein by reference.

BACKGROUND OF THE DISCLOSURE

1. Field of the Technology

The present invention relates to network authentication techniques, and particularly to a method for implementing CDMA2000 HRPD user authentication in multi-mode networks including IS95/CDMA2000 1x and CDMA2000 HRPD by using the original Mobile Switching Center (MSC)/Visiting Location Register (VLR) and Home Location Register (HLR)/Authentication Center (AC) in the IS95/CDMA2000 1x system.

2. Background of the Invention

CDMA is an advanced technology of digital cellular mobile communications and one of the most important radio transmission technologies (RTT) of 3G accepted by the International Telecommunications Union (ITU). Since the first release of CDMA standards by QUALCOMM Incorporated in 1990, there have been two important stages in the evolution of CDMA technology.

As shown in FIG. 1, the network architecture of CDMA2000 1x consists of Mobile Station (MS), Base Transceiver Station (BTS), Base Station Controller (BSC), Packet Control Function (PCF), Packet Data Service Node (PDSN), Authentication, Authorization, Accounting server (AAA), and IS-41 core network, where IS-41 core network includes MSC, VLR, HLR, and AC.

User authentication in CDMA IS95 and CDMA 2000 1x networks is completed jointly by MSC/VLR and HLR/AC. Moreover, the Shared Secret Data (SSD) are stored in a terminal and HLR/AC as one of the input parameters for authentication while identical keys for authentication (A-key) are stored in the terminal and HLR/AC specially for use in updating SSD. When authentication is needed, the authentication result is calculated by the algorithm of Cellular Authentication and Voice Encryption (CAVE) with the parameters of SSD, random number, Electronic Serial Number (ESN), and Mobile Station Identity Number (MIN), then MSC/VLR or HLR/AC will compare the authentication result to check whether it is consistent or not; if not consistent, the system will initiate an updating of SSD. After the updating of SSD is successful, i.e. the SSD at the terminal side and SSD at the network side are consistent, next authentication will be successful only when the authentication result calculated by the user with SSD is consistent with the authentication result calculated by HLR/AC.

CDMA 2000 HRPD (CDMA 2000 1xEV-DO), simplified as HRPD, is an upgraded technology of CDMA 2000 1x, providing high-rate packet data service with the single-user downstream rate up to 2.4 Mbps.

As shown in FIG. 2, the networking architecture of HRPD consists of Access Terminal (AT), Access Network (AN), AN AAA, PCF, PDSN, and AAA. User authentication is implemented in an HRPD network mainly by AN AAA. After authentication succeeds, AN AAA will return to AT the International Mobile Subscriber Identity (IMSI) of the terminal for use in later switching and charging processes. In the authentication process of HRPD, the interface A12 between BSC/PCF and AN AAA is used and this interface adopts the Remote Access Dial User Service protocol (RADIUS) with the Password Authentication Protocol (PAP) and Check-Handshake Authentication Protocol (CHAP) as the main authentication mechanisms. Since CHAP has relatively better performance in security, there are more applications of CHAP in authentication.

CHAP adopts the identity authentication algorithm of private-key-based Message Digest (MD). As shown in FIG. 3, take the CHAP protocol as an example and the authentication process through RADIUS protocol specifically includes:

Step 301: AT consults with the network side via PPP/LCP and decides to use CHAP for authentication;

Step 302: AN sends a Challenge message to AT to initiate authentication, and the message contains the random number generated by AN;

Step 303: AT calculates the digest with the random number by means of the encryption algorithm prescribed by CHAP, and then sends the user name and digest to AN via a Response message;

Step 304: AN constructs at Interface A12 an Access Request message of the RADIUS protocol to carry the user name, random number and digest, and sends the message to AN AAA;

Step 305: AN AAA calculates a digest with the random number by means of the same algorithm and judge by comparison whether this digest is consistent with the digest sent up from the terminal, if consistent, the authentication succeeds and AN AAA sends an Access Accept message to AN, otherwise the authentication fails and go to step 302;

Step 306: AN sends a Success message to the terminal, notifying AT that the authentication is successful.

It can be seen from the above process that authentication of HRPD users in the prior art requires the use of AN AAA and the authentication is a one-way process.

At present, along with the development of market economy and technology, more and more operators desire to operate simultaneously various networks. For example, an operator of IS95/CDMA 2000 1x network would like to expand its service to CDMA 2000 1xDO network while authentication in CDMA 2000 1xDO requires setting up of a special AN AAA for authentication. For a user having subscribed to various CDMA networks simultaneously, this approach of authentication requires opening accounts at both HLR and AN AAA, making authentication modes not unified and maintenance inconvenient, which is not conducive to unified operation. Moreover, this approach requires a special nationwide network of AN AAA for HRPD user authentication, resulting in high cost in network construction.

In addition, as Wireless Local Area Network (WLAN) and CDMA networks are complementary, traditional operators of CDMA mobile networks are considering providing WLAN access service. As WLAN and CDMA IS95/CDMA 2000 1x are two independent types of networks, account-opening and maintenance of the two types of networks are independent, and so are the authentication mechanisms. Therefore, more AAAs are required in authentication implementation and each AAA must be able to interface with other AAAs, which requires a special roaming network to be set up between WLAN and AAA to implement roaming operation, resulting in high cost of network construction.

SUMMARY OF THE INVENTION

In accordance with one aspect of the disclosure, a method is provided for implementing authentication of high-rate packet data services, applicable to a multi-mode network including IS95/CDMA 2000 1x and CDMA 2000 HRPD networks so as to implement low-cost and convenient authentication for users of HRPD network.

In accordance with one aspect of the disclosed method, AT takes the user information in the User Identity Module (UIM) as the user identifier and starts an authentication of EAP. MSC/VLR obtains a random number and the first authentication number corresponding to the random number based on the user identifier, where the first authentication number is calculated with the SSD stored at the network side and said random number. AT calculates the second authentication number based on said random number and the SSD stored in AT itself, MSC/VLR judges by comparison whether the first authentication number and the second authentication number are consistent. If yes, the authentication succeeds, and otherwise, the authentication fails.

After the authentication succeeds, the disclosed method may further include the MSC/VLR judging whether the user has subscribed to the service. If yes, MSC returns Service Accept to AT via AN, and otherwise, returns Service Reject to AT via AN.

After the authentication fails, the disclosed method may further include the MSC notifying HLR via an ASREPORT message that the authentication fails, then HLR re-calculates SSD and updates SSDs at the terminal and network sides.

The AT taking the user information may include the steps of AN requesting the user identifier from AT, AT obtaining the user identifier from UIM and sending the user identifier to AN. After receiving the user identifier, AN may send the user identifier to MSC.

In the user information taking step, AN may request the user identifier from AT through a PPP/EAP-Request/Identity message; AT may send the user identifier to AN through a PPP/EAP-Response/Identity message. In the sending step, the AN may send the user identifier to MSC/VLR through a CM Service Request message.

In some cases, the random number obtaining step includes, after receiving the CM Service Request message, MSC/VLR sending to HLR an authentication request, AUTHREQ, based on the user identifier contained in the CM Service Request message, and after receiving the AUTHREQ, HLR sending to MSC/VLR a response, authreq, which includes the random number and the first authentication number. The random number obtaining step may further include, after receiving the authreq, MSC/VLR sending to AN a unique inquiry Authentication Request message, where the authreq includes said random number, and after receiving the Authentication Request message, AN converting this message into a message of EAP-UIM protocol and sends the converted message to AT through a PPP/EAP-Request/UIM/Challenge message.

In some cases, the calculating and judging step includes AT sending the calculated second authentication number to AN through a PPP/EAP-Response/UIM/Challenge message of EAP-UIM protocol, and after receiving the message, AN sending the second authentication number to MSC through a unique inquiry Authentication Response message.

In the random number obtaining step, MSC may obtain the random number and the first authentication number from HLR according to the user identifier.

In the random number obtaining step, MSC may obtain said random number and first authentication number from VLR according to the user identifier.

In the step involving judging whether the user has subscribed to the service, the MSC/VLR may judge through the user identifier whether the user has subscribed to HRPD service.

In accordance with another aspect of the disclosure, the user need not input the user name and password manually so that it is convenient in use. Further, it is therefore conducive to unified operation, for users of IS95/CDMA 2000 1x and HRPD can open account at HLR via IMSI in a unified way and have unified identifiers so that it is convenient for the operator to make operation. Still further, there is no need for a special nationwide network of AN AAA, and no need for new network elements either. As the existing CDMA IS41 core network can be utilized to support nationwide roaming, cost is reduced. Because HRPD users can continue to use their previous UIM cards, it is conducive to the transformation of users of CDMA IS95 and CDMA 2000 1x to HRPD network.

DETAILED DESCRIPTION OF PREFERRED EMBODIMENTS

In accordance with one aspect of the disclosure, in an HRPD network, authentication and account-opening is implemented by using the original MSC and HLR/AC in the CDMA IS95 or CDMA 2000 1x network, and nationwide roaming operation is supported by the existing CDMA IS41 core network while mutual authentication between a terminal and the network is allowed. Since HLR and AC are typically integrated in a same physical entity, they are hereinafter referred to as HLR.

Figure 1:
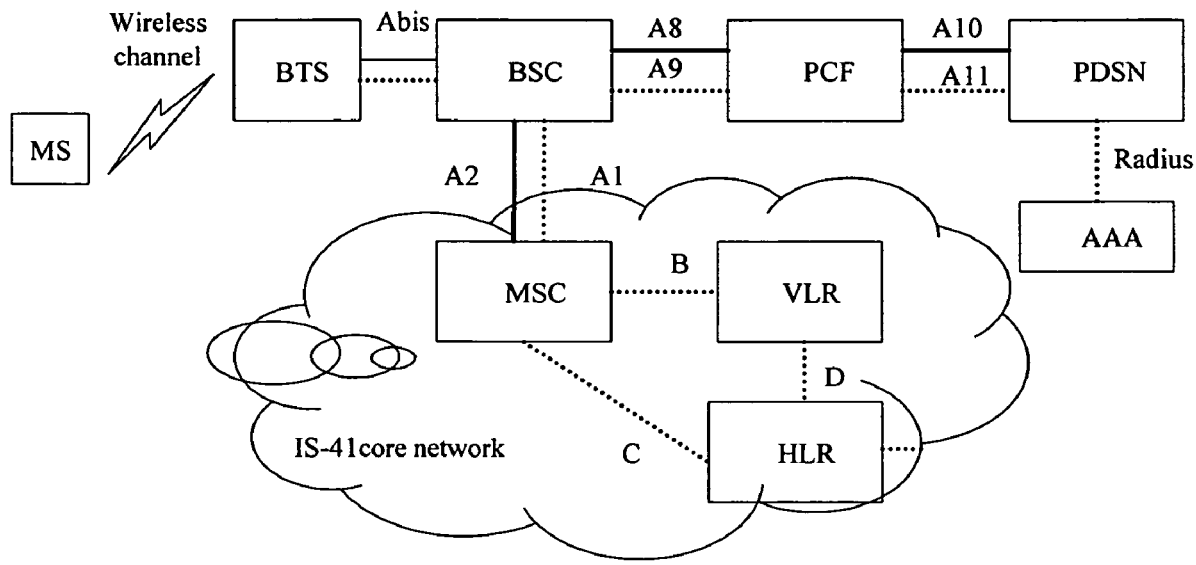
FIG. 1 is a schematic diagram illustrating the networking of IS95/CDMA 2000 1x system.
Figure 2:
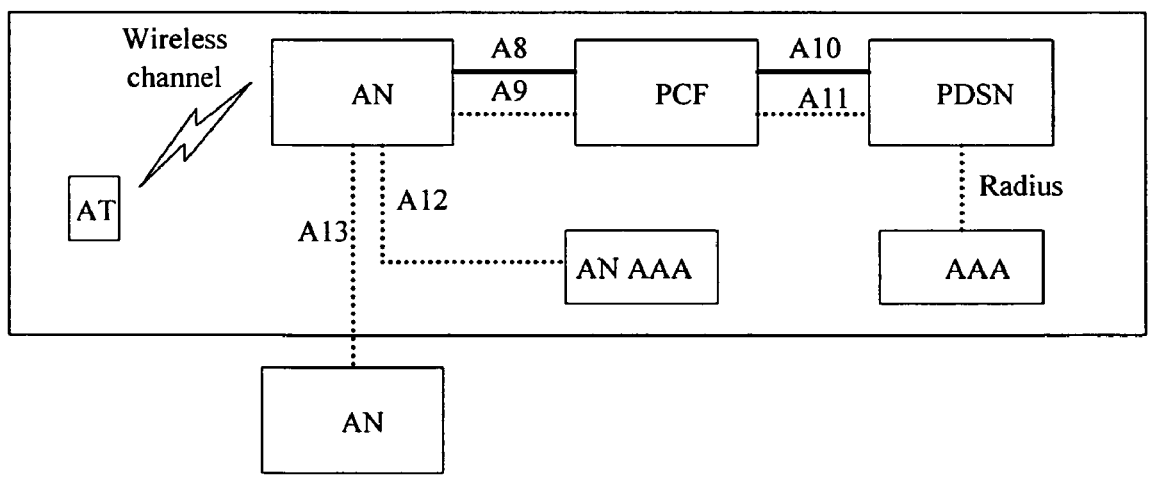
FIG. 2 is a schematic diagram illustrating the networking of HRPD network.
Figure 3:
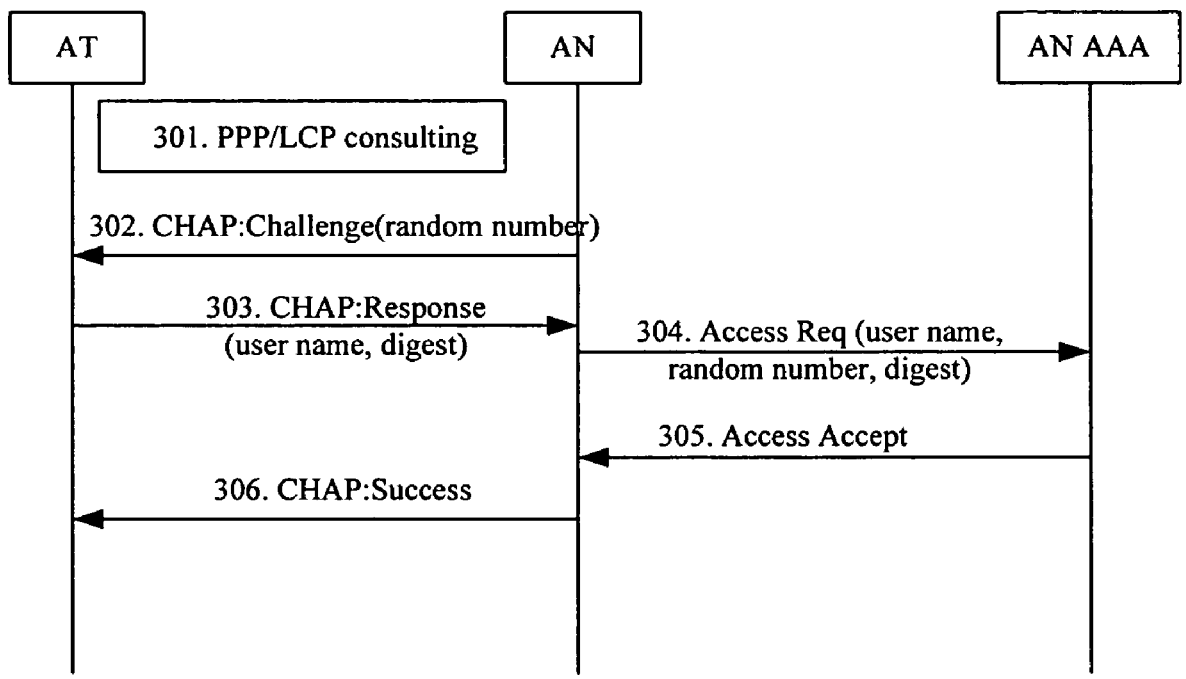
FIG. 3 shows the flowchart of authentication in HRPD network in the prior art.
Figure 4:
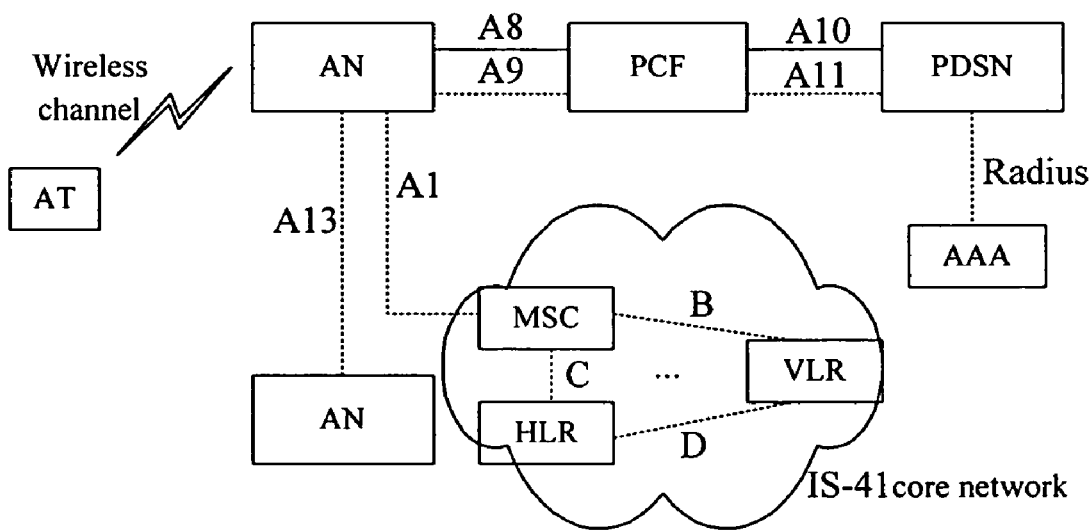
FIG. 4 is a schematic diagram illustrating the network architecture for implementing one aspect of the disclosure.

As shown in FIG. 4, the network architecture for implementing the disclosed method includes: AT, AN, MSC/VLR, and HLR, where AN and MSC are interfaced by A1, for transmission of messages of authentication and authorization information between AN and MSC; MSC and VLR are interfaced by B, for transmission of signaling messages between MSC and VLR; MSC and HLR are interfaced by C, for transmission of signaling messages between MSC and HLR; and HLR and VLR are interfaced by D, for transmission of signaling messages between HLR and VLR. The extended EAP-UIM authentication protocol is used between AN and terminals, extended interface A1 is used between AN and MSC, and IS41 protocol is adopted between MSC and HLR. The network element may involve the AN simultaneously supporting EAP protocol and CDMA A1 interface protocol, such that AT is able to read the information of UIM cards.

Figure 5:
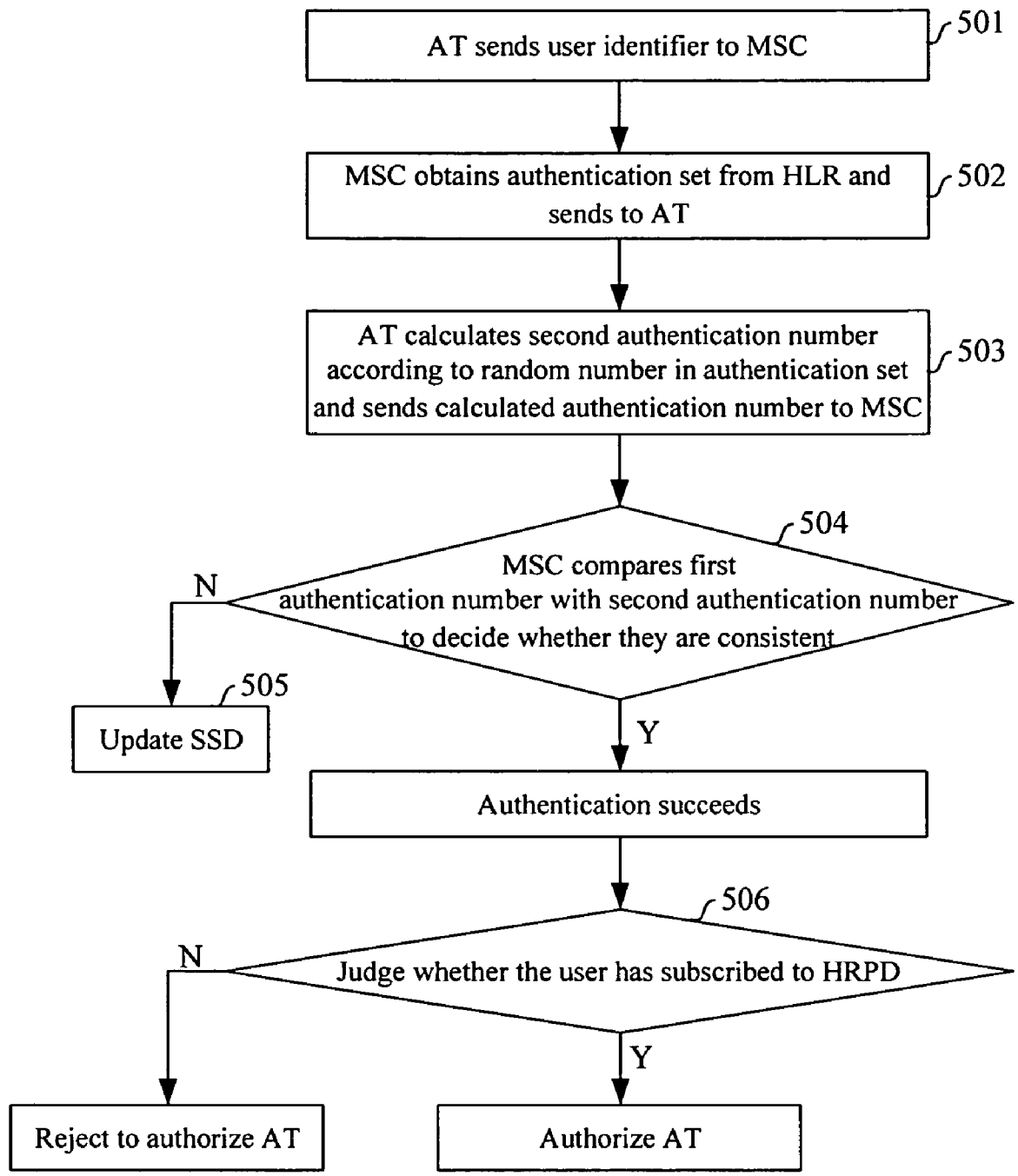
FIG. 5 is a flowchart for implementing one aspect of the disclosure.

As shown in FIG. 5, the method for implementing one embodiment of the disclosed method includes the following steps.

Step 501: AT takes the user information in UIM as the user identifier, sends the user identifier of its own to MSC via AN, and starts EAP authentication.

Step 502: MSC obtains a random number and the first authentication number corresponding to the random number from HLR according to the user identifier, and then sends the obtained random number to AT via AN, where the first authentication number is calculated by HLR based on the random number and the self-stored SSD, and the first authentication number and the random number constitute an authentication set.

503: AT calculates the second authentication number based on random number and the self-stored SSD by using the same method as used in HLR, and sends the calculated second authentication number to MSC via AN.

Step 504: MSC judges by comparison whether the first and second authentication numbers are consistent, and if consistent, the authentication succeeds and proceeds to step 506, and otherwise, the authentication fails and proceeds to step 505.

Step 505: MSC informs HLR of the authentication result, and HLR initiates the updating of SSD and updates the SSDs at AT and the network side, and then proceeds to step 501.

Step 506: MSC judges, based on the user identifier, whether the user has subscribed to HRPD service, and if yes, sends to AT a Service Accept message, and otherwise sends to AT a Service Reject message.

When AT switches on for the first time, as the SSD stored in AT and the SSD stored in HLR are different, the first authentication will always fail. That is why updating of SSD is needed. After SSD is updated, AT and HLR will have the same SSD stored. Therefore, normally the second authentication will succeed.

Hereinafter the solution in accordance with one aspect is described in detail with reference to the accompanying drawings and a specific embodiment.

In this embodiment, two pieces of signaling, CM Service Accept and CM Service Reject, obtained by extension on the basis of the existing interface A1, are adopted. Authentication between AT and AN is carried out by using PPP/EAP/EAP-UIM protocol. EAP is carried on PPP, and is able to support authentication processes at HLR, for instance, the unique inquiry process and SSD updating process. In addition, the interface between AN and MSC adopts the CDMA A1 interface protocol and standard No.7 signaling, and the interface between MSC/VLR and HLR/AC adopts standard No.7 interface and IS41 protocol.

Figure 6:
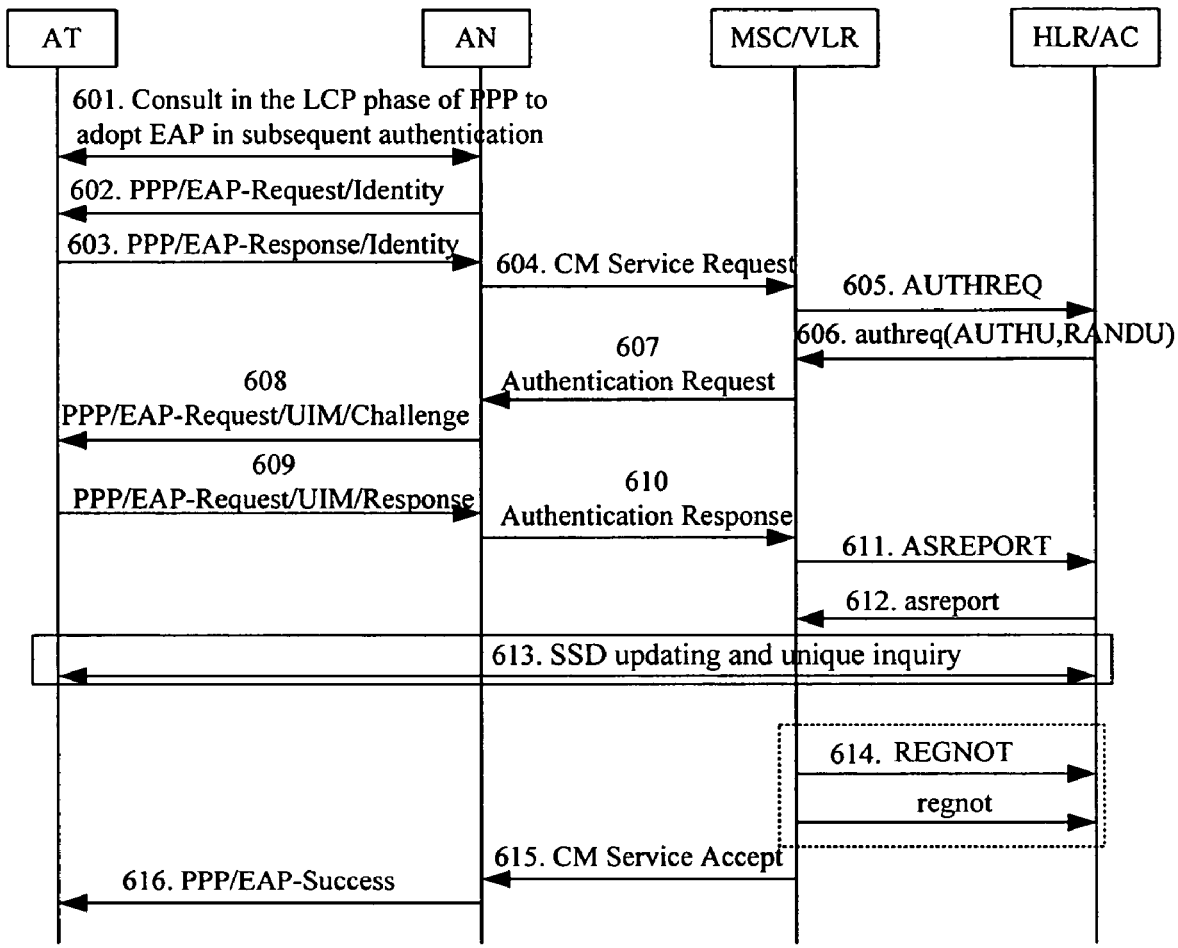
FIG. 6 is the flowchart of one embodiment in accordance with one aspect of the disclosure.

As shown in FIG. 6, the authentication process of HRPD network by utilizing the original MSC and HLR in CDMA IS95 or CDMA 2000 1x network is as follows.

Step 601: AN consults with AT in the LCP phase of PPP to adopt EAP protocol in the subsequent authentication phase.

Step 602: After the LCP phase is over, AN initiatively requests IMSI and ESN of the user from AT through a PPP/EAP-Request/Identity message.

Step 603: AT obtains the user identifier from UIM, and sends the use identifier to AN through a PPP/EAP-Response/Identity message.

Step 604: After receiving the PPP/EAP-Response/Identity message, AN sends to MSC a CM Service Request message which contains the user identifier.

Step 605: After receiving the CM Service Request message, MSC/VLR sends an authentication request, AUTHREQ, to HLR according to the user identifier contained in the received message.

Step 606: After receiving the AUTHREQ request, HLR, based on the configuration, initiates a response, authreq, which contains the random number and the first authentication number for authentication of AT. The random number is generated and the authentication number corresponding to the random number is calculated based on the SSD stored at the network side by HLR after HLR has received the user identifier.

Step 607: After receiving the AUTHREQ request, MSC/VLR sends to AN a unique inquiry Authentication Request message, which carries said random number.

Step 608: After receiving the Authentication Request message, AN converts this message into the message of EAP-UIM protocol, and sends the converted message to AT through a PPP/EAP-Request/UIM/Challenge message.

Step 609: After receiving the unique inquiry Authentication Request message, AT calculates the second authentication number based on the random number for authentication of AT contained in the Authentication Request message, and returns the second authentication number to AN through a PPP/EAP-Response/UIM/Challenge message in the EAP-UIM protocol over the PPP connection.

Step 610: After receiving the authentication number, AN terminates the EAP-UIM process, converts the second authentication number into a unique inquiry Authentication Response, and returns the Authentication Response message to MSC.

Step 611: After receiving the Authentication Response message, MSC obtains the authentication result by comparing the first and second authentication numbers, and then informs HLR/AC of the authentication result through an ASREPORT message.

Step 612: After receiving the authentication result, HLR judges whether the authentication result is consistent. If consistent, the authentication succeeds, and HLR sends the indication of authentication success to MSC/VLR, and proceeds to step 613. Otherwise, HLR may send the indication of authentication failure or initiate an SSD updating process in the ASREPORT message, then proceed to step 603.

Step 613: MSC/VLR judges whether there is the user information in itself, and if there is, proceeds to step 615, and otherwise sends a location registration request to HLR/AC through a REGNOT message.

Step 614: After receiving the location registration request, HLR/AC returns the user subscription information to MSC/VLR.

Step 615: After receiving the subscription agreement, MSC/VLR judges according to the subscription information in the agreement whether the user has subscribed to HRPD service. If the service is authorized, MSC returns CM Service Accept to AN. If the service is not authorized, MSC returns CM Service Reject to AN, and AN informs AT of the failure of authentication by PPP/EAP-Failure and simultaneously terminates the EAP authentication process. The illustration of FIG. 6 assumes that the service is authorized.

Step 616: AN informs AT of the success of authentication by PPP/EAP-Success, and simultaneously terminates the EAP authentication process.

Because there are two modes for SSD, shared or not shared, it should be noted that the above embodiment is discussed for SSD not shared. When SSD is shared, MSC/VLR need not make interaction with HLR/AC.

In accordance with this embodiment, the existing IS41 network in the previous CDMA IS95 or CDMA 2000 1x network is utilized to make authentication and implement roaming in an HRPD network. By utilizing the authentication mechanism of CDMA network, opening account and making authentication for HRPD data service, IS95/CDMA 2000 1x data service and circuit service are all carried out in HLR in a unified way. Further, by utilizing the IS41 roaming network in CDMA IS95 or CDMA 2000 1x network, a solution to the roaming operation in an HRPD network is found while saving the cost of AN AAA construction. Still further, by providing a mutual authentication mechanism, a terminal is able to make authentication of the network, improving the security of authentication.

The invention claimed is:

1. A method for implementing authentication of high-rate packet data (HRPD) services, the method comprising the steps of:
   (A) taking, by way of an Access Terminal (AT), user information in a User Identity Module (UIM) as a user identifier and starting an authentication of extended authentication protocol (EAP);
   (B) obtaining, by way of a Mobile Switching Center/Visiting Location Register (MSC/VLR), a random number and a first authentication number corresponding to the random number based on the user identifier, wherein said first authentication number is calculated with Shared Secret Data (SSD) stored at a network side and said random number; and,
   (C) calculating, by way of the AT, a second authentication number based on said random number and SSD stored in AT, judging, by way of the MSC/VLR, by comparing whether the first authentication number and the second authentication number are consistent, such that, if yes, the authentication succeeds, and otherwise, the authentication fails.

2. A method according to claim 1, after the authentication succeeds, further comprising the step of (D) judging, by way of the MSC/VLR, whether the user has subscribed to HRPD service, and if yes, returning, by way of the MSC/VLR, Service Accept to the AT via an Access Network (AN), and otherwise, returning Service Reject to the AT via the AN.

3. A method according to claim 2, wherein said judging whether the user has subscribed to the HRPD service in step(D) comprises judging through the user identifier whether the user has subscribed to the HRPD service.

4. A method according to claim 1, further comprising, after the authentication fails, notifying, by way of the MSC/VLR, a Home Location Register (HLR) that the authentication failed, and re-calculating SSD and updating SSDs, by way of the HLR, at a terminal and network sides.

5. A method according to claim 1, wherein step (A) further comprising the steps of:
   (A1) after receiving the request from an AN for the user identifier, obtaining, by way of the AT, the user identifier from the UIM and sending the user identifier to the AN; and,
   (A2) after receiving the user identifier, sending, by way of the AN, the user identifier to MSC.

6. A method according to claim 5, wherein, in step (A1), requesting by way of the AN, the user identifier from the AT through a PPP/EAP-Request/Identity message, and sending, by way of the AT, the user identifier to the AN through a PPP/EAP-Response/Identity message; in step (A2), sending, by way of the AN, the user identifier to the MSC/VLR through a CM Service Request message.

7. A method according to claim 6, wherein step (B) further comprising the steps of:
   (B1) after receiving the CM Service Request message, sending, by way of the MSC/VLR, to an Home Location Register (HLR) an authentication request, AUTHREQ, based on the user identifier contained in the CM Service Request message;
   (B2) after receiving the AUTHREQ, initiating, by way of the HLR, to the MSC/VLR a response, authreq, which includes the random number and the first authentication number;
   (B3) after receiving the authreq, the sending, by way of the MSC/VLR, to the AN a unique inquiry Authentication Request message, wherein the authreq includes said random number; and
   (B4) after receiving the Authentication Request message, converting, by way of the AN, this message into a message of EAP-UIM protocol and sending the converted message to the AT through a PPP/EAP-Request/UIM/Challenge message.

8. A method according to claim 1, wherein step (C) further comprising the steps of:
   (C1) sending, by way of the AT, the calculated second authentication number to AN through a PPP/EAP-Response/UIM/Challenge message of EAP-UIM protocol; and
   (C2) after receiving the message, sending, byway of the AN, the second authentication number to the MSC/VLR through a unique inquiry Authentication Response message.

9. A method according to claim 1, wherein, in step (B), obtaining, by way of the MSC/VLR, a random number and a first authentication number from an Home Location Register (HLR) according to the user identifier.

10. A method according to claim 1, wherein, in step (B), obtaining, by way of the MSC/VLR, said random number and first authentication number from VLR according to the user identifier.

11. A method for implementing authentication of high-rate packet data (HRPD) services, the method comprising the steps of:
   (A) receiving, by way of a Mobile Switching Center/Visiting Location Register (MSC/VLR), a user identifier from an Access Terminal (AT)which takes user information in a User Identity Module (UIM) as the user identifier and starts an authentication of extended authentication protocol (EAP);
   (B) obtaining, by way of the MSC/VLR, a random number and a first authentication number corresponding to the random number based on the user identifier, wherein said first authentication number is calculated with Shared Secret Data (SSD) stored at a network side and said random number; and,
   (C) judging, by way of the MSC/VLR after receiving a second authentication number calculated by the AT based on said random number and SSD stored in the AT, by comparing whether the first authentication number and the second authentication number are consistent, such that, if yes, the authentication succeeds, and otherwise, the authentication fails.

12. A method according to claim 11, after the authentication succeeds, further comprising the step of (D) judging, by way of the MSC/VLR, whether the user has subscribed to HRPD service, and if yes, returning, by way of the MSC/VLR, Service Accept to the AT via an Access Network (AN), and otherwise, returning Service Reject to the AT via the AN.

13. A method according to claim 12, wherein said judging whether the user has subscribed to the HRPD service in step(D) comprises judging through the user identifier whether the user has subscribed to the HRPD service.

14. A method according to claim 11, further comprising, after the authentication fails, notifying, by way of the MSC/VLR, a Home Location Register (HLR) that the authentication failed, and re-calculating SSD and updating SSDs, by way of the HLR, at a terminal and network sides.

15. A method according to claim 11, wherein step (A) further comprising the steps of:
(A1) after receiving the request from an AN for the user identifier, obtaining, by way of the AT, the user identifier from the UIM and sending the user identifier to the AN; and,
(A2) after receiving the user identifier, sending, by way of the AN, the user identifier to MSC.

16. A method according to claim 15, wherein step (B) further comprising the steps of:
(B1) after receiving the CM Service Request message, sending, by way of the MSC/VLR, to an Home Location Register (HLR) an authentication request, AUTHREQ, based on the user identifier contained in the CM Service Request message;
(B2) after receiving the AUTHREQ, initiating, by way of the HLR, to the MSC/VLR a response, authreq, which includes the random number and the first authentication number;
(B3) after receiving the authreq, sending, by way of the MSC/VLR, to the AN a unique inquiry Authentication Request message, wherein the authreq includes said random number; and
(B4) after receiving the Authentication Request message, converting, by way of the AN, this message into a message of EAP-UIM protocol and sending the converted message to the AT through a PPP/EAP-Request/UIM/Challenge message.

17. A method according to claim 11, wherein, in step (B), obtaining, by way of the MSC/VLR, a random number and a first authentication number from an Home Location Register (HLR) according to the user identifier.

18. A method according to claim 11, wherein, in step (B), obtaining, by way of the MSC/VLR, said random number and first authentication number from VLR according to the user identifier.

19. A Mobile Switching Center/Visiting Location Register (MSC/VLR) for implementing authentication of high-rate packet data (HRPD) services, configured to implement the method comprising:
receiving, by way of a Mobile Switching Center/Visiting Location Register (MSC/VLR), user information in a User Identity Module (UIM) from an Access Terminal (AT) as a user identifier and starting the authentication of extended authentication protocol (EAP);
obtaining, by way of the MSC/VLR, a random number and a first authentication number corresponding to the random number based on the user identifier, wherein said first authentication number is calculated with Shared Secret Data (SSD) stored at a network side and said random number; and
judging, by way of the MSC/VLR after receiving a second authentication number calculated by the AT based on said random number and SSD stored in the AT, by comparing whether the first authentication number and the second authentication number are consistent, such that, if yes, the authentication succeeds, and otherwise, the authentication fails.

20. A MSC/VLR according to claim 19, further comprising:
judging, by way of the MSC/VLR, whether the user has subscribed to HRPD service, and if yes, returning Service Accept to the AT via an Access Network (AN), and otherwise, returning Service Reject to the AT via the AN.

* * * * *